(12) United States Patent
Yeap et al.

(10) Patent No.: US 12,079,682 B2
(45) Date of Patent: Sep. 3, 2024

(54) CARD-TYPE INFORMATION SUBSTRATE INCLUDING A FRAME

(71) Applicant: LINXENS HOLDING, Mantes-la-Jolie (FR)

(72) Inventors: Yean Wei Yeap, Singapore (SG); Wen Qiang Chin, Singapore (SG); Minli Cindy Ng, Singapore (SG)

(73) Assignee: LINXENS HOLDING, Mantes-la-Jolie (FR)

( * ) Notice: Subject to any disclaimer, the term of this patent is extended or adjusted under 35 U.S.C. 154(b) by 0 days.

(21) Appl. No.: 17/768,782

(22) PCT Filed: Oct. 18, 2019

(86) PCT No.: PCT/IB2019/001183
§ 371 (c)(1),
(2) Date: Apr. 13, 2022

(87) PCT Pub. No.: WO2021/074658
PCT Pub. Date: Apr. 22, 2021

(65) Prior Publication Data
US 2023/0145739 A1 May 11, 2023

(51) Int. Cl.
*G06K 19/06* (2006.01)
*G06K 19/077* (2006.01)

(52) U.S. Cl.
CPC . *G06K 19/07722* (2013.01); *G06K 19/07724* (2013.01); *G06K 19/07769* (2013.01); *G06K 19/07771* (2013.01); *G06K 19/07773* (2013.01)

(58) Field of Classification Search
CPC ....... G06K 19/07749; G06K 19/07771; G06K 19/07722; G06K 19/0723; G06K 19/077; G06Q 20/341; G06Q 20/34

USPC ........................ 235/492, 487, 462.46, 472.02
See application file for complete search history.

(56) References Cited

U.S. PATENT DOCUMENTS

| | | | |
|---|---|---|---|
| 5,690,773 A | 11/1997 | Fidalgo et al. | |
| 2011/0031319 A1* | 2/2011 | Kiekhaefer | G06K 19/07722 235/492 |
| 2011/0068178 A1* | 3/2011 | Gebhart | H01Q 19/10 235/492 |

(Continued)

FOREIGN PATENT DOCUMENTS

| | | |
|---|---|---|
| CN | 107851208 A | 3/2018 |
| KR | 20160057281 A | 5/2016 |
| WO | 2021/074658 A1 | 4/2021 |

OTHER PUBLICATIONS

International Search Report and Written Opinion of related International Application No. PCT/IB2019/001183, dated Sep. 18, 2020, 16 pages.

*Primary Examiner* — Daniel St Cyr
(74) *Attorney, Agent, or Firm* — DITTHAVONG, STEINER, & MLOTKOWSKI

(57) ABSTRACT

The present invention relates to card-type information substrates, such as payment cards, in which a frame is implemented so as to impart increased weight and/or superior appearance to the card-type substrates, wherein the influence of the frame on the RF performance of the card-type substrate is taken into consideration. For example, in illustrative embodiments the influence of a conductive material in the frame is reduced by selecting one or more appropriate features countering the negative effect on the RF performance.

24 Claims, 4 Drawing Sheets

(56) References Cited

U.S. PATENT DOCUMENTS

| | | | |
|---|---|---|---|
| 2015/0021403 A1* | 1/2015 | Finn | B23K 26/40 |
| | | | 438/22 |
| 2015/0269477 A1 | 9/2015 | Finn et al. | |
| 2016/0110639 A1 | 4/2016 | Finn et al. | |
| 2018/0339503 A1* | 11/2018 | Finn | H01Q 1/2225 |
| 2019/0286961 A1 | 9/2019 | Lowe | |

* cited by examiner

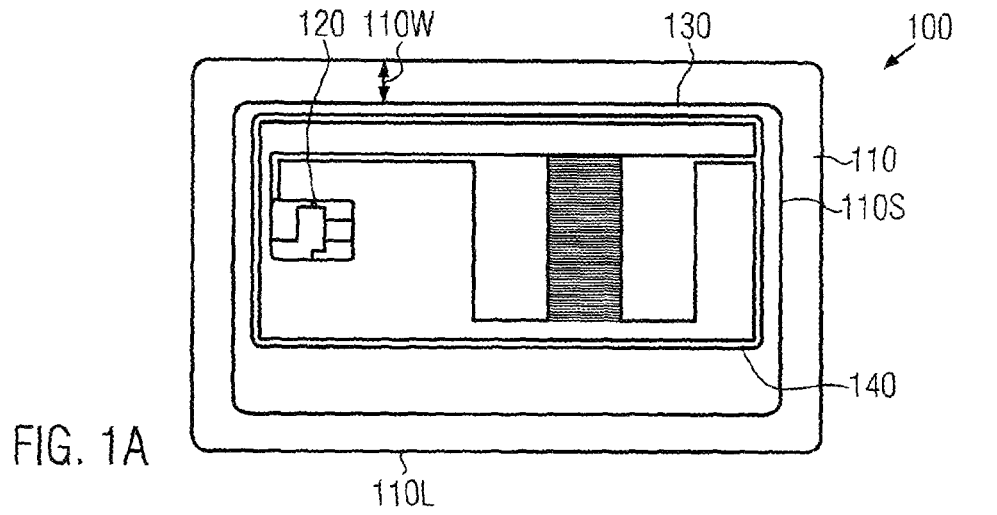
FIG. 1A
FIG. 1B
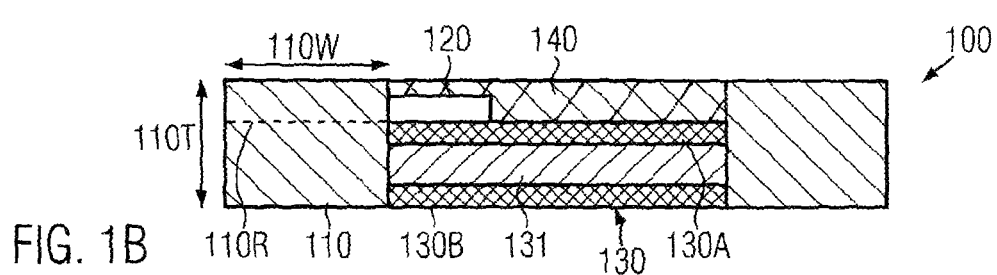
FIG. 2A
FIG. 2B
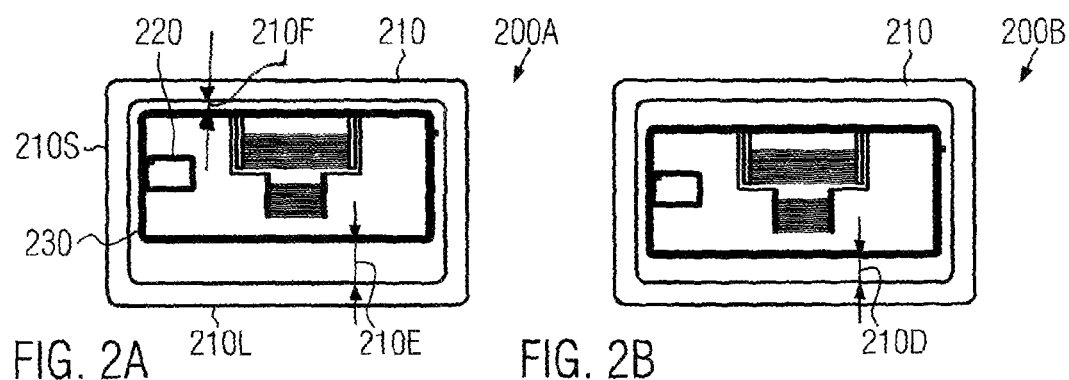
| | Frequency (MHz) | S11 (dB) | EMVCo pass rate |
|---|---|---|---|
| 200A | 14.5 | -1.3 | 63/91 |
| 200B | 14.3 | -1.8 | 77/91 |
FIG. 2C

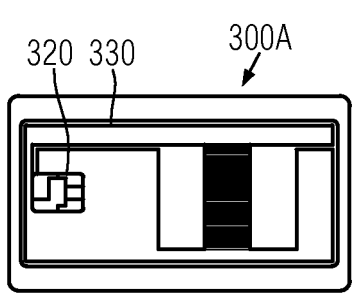
FIG. 3A
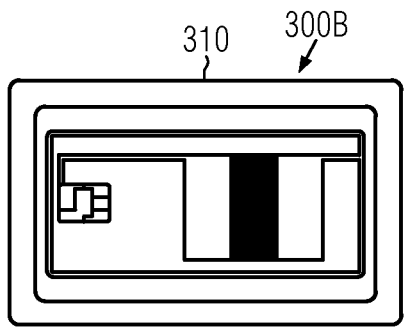
FIG. 3B
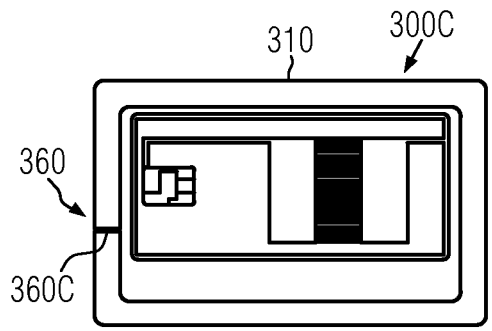
FIG. 3C
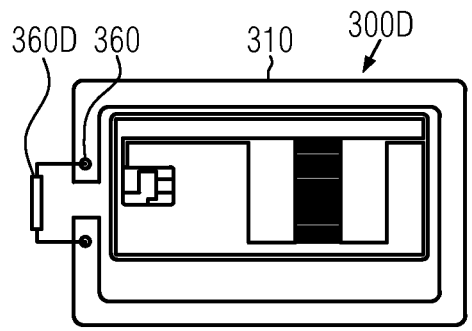
FIG. 3D
| Fig. | Configuration | Frequency (MHz) | S11 (dB) | EMVCo pass rate |
|---|---|---|---|---|
| 3A | No metal | 13.3 | -7.3 | 89/91 |
| 3B | With metal | 14.2 | -1.9 | 77/91 |
| 3C | With metal (Slit) | 13.3 | -6.9 | 89/91 |
| 3D | Filled with Resitor | 13.3 | -4.6 | 90/91 |
FIG. 3E

CARD-TYPE INFORMATION SUBSTRATE INCLUDING A FRAME

TECHNICAL FIELD

The present invention generally relates to card-type information substrates, such as cards used for payment activities, and the like, which include wireless information exchange capability by wireless interaction with a corresponding reader device.

BACKGROUND ART

In many technical fields wireless information exchange is taken advantage of in order to provide superior handling of information carriers and allow enhanced functionality. For example, a growing number of transactions, such as payment transactions, and the like, may be accomplished or at least triggered on the basis of specifically designed information substrates, which may contain sensitive user information as well as the technological platform required for initiating a corresponding transaction. For example, respective payment cards of any type may be typically used for initiating financial transactions or any other activities requiring the exchange of sensitive user information with a respective counter part device, wherein increasingly wireless information exchange by radio-frequency (RF) is relied on. That is, although many conventional payment cards, as one example of card-type information substrate, may still be based physical contact of a corresponding electronic module provided within the card base material and exposing contact pads for interacting with respective contact pads of a reader device, additionally or alternatively such payment cards are increasingly equipped with a respective antenna for wirelessly interacting with the respective reader device. Consequently, specific RF characteristics may have to be implemented and dedicated specifications have to be met in order for a respective payment card to be usable in combination with standardised reader devices.

In addition to steadily increasing technological capabilities of any such card-type information substrates, such as payment cards, other characteristics thereof have to respect certain requirements in order to meet user expectations with respect to handling and optical appearance of these information substrates. For example, such card-type information substrates may have to exhibit a significant mechanical robustness so as to withstand mechanical stress, such as bending forces, and the like, over an extended period of time. Moreover, in general the substrate itself may have to exhibit a high degree of tamper resistance so as to substantially avoid the possibility of unintended change of information and/or functionality of the card-type substrate. In addition to any such requirements, also optical and haptic appearance of the card-type substrate is increasingly gaining in importance in order to provide for competitiveness of such substrates.

For example, frequently metal components, such as metal pads, and the like are added to the card base material so as to impart increased weight or superior outer appearance to card-type substrates. In still other approaches respective card-type information substrates are formed on the basis of a metal base material, thereby achieving heavy weight and a specific outer appearance, which may result in conveying presence of superior value of the corresponding payment card. Typically, such metal-based payment cards are designed for contact-based coupling to a corresponding reader device, thereby, however, significantly restricting usable lifetime due to wear and tear of the contacts and also limiting user experience due to the lack of wireless connectivity.

In view of the situation described above, it is an object of the present invention to allow superior external appearance and/or weight of a card-type information substrate while at the same time increasing flexibility with respect to wireless connectivity capabilities of the card-type information substrate.

DISCLOSURE OF INVENTION

In view of the situation described above the present invention is generally based on the technical concept that additional weight and/or superior appearance may be imparted to card-type information substrates by providing a frame, which is made of a different material as a card base material in order to add at least additional weight to the card, without changing the specified outer dimensions of the card-type substrate. Moreover, the card-type information substrate may still be provided with wireless connectivity capabilities irrespective of the type of material used in the card frame.

In one aspect of the present invention therefore the above-specified technical object is solved by a card-type information substrate. The card-type information substrate includes a substrate material made of plastic and an electronic module that is embedded in the substrate material. Furthermore, the card-type information substrate includes a frame that is formed around the perimeter of the substrate material, wherein the frame imparts increased weight and/or superior appearance to the card-type information substrate. Additionally, the card-type information substrate includes an antenna that is positioned within an outline of the frame and that is operatively coupled to the electronic module to perform wireless communication.

According to this aspect of the present invention the dimension, shape and the material composition of the frame may be selected so as to achieve increased weight and/or superior appearance, which may be accomplished by using an appropriate type of material or materials and incorporating the material(s) into the card base material on the basis of an appropriately selected configuration.

In this respect it should be appreciated that increased weight is to be understood as a difference in weight of the inventive card-type substrate having formed therein the frame compared to a substantially identical card-type substrate, in which the frame would be replaced by the base material of the remainder of the card-type substrate. That is, the volume occupied by the frame material has a greater weight compared to the substrate material made of plastic for otherwise identical overall dimensions of the card-type substrate. To this end, any appropriate materials may be used, which may have basically a higher specific weight compared to the substrate material in the form of plastic, wherein typically many of such appropriate frame materials may additionally impart superior mechanical robustness to the card-type information substrate compared to the situation, in which the substrate material in the form of plastic would be used throughout the entire card.

Furthermore, it is to be appreciated that the term "frame" is to be understood as a component that encloses at least a significant portion of the substrate material, while still leaving a significant central area that is not covered by the frame material. For example, a width of the frame, although in some embodiments it may vary along the circumferential direction, may be restricted to approximately 3 to 25% of the total extension of the smaller one of the two orthogonal lateral dimensions of the card-type substrate. For example, for a card-type substrate having a length, as the greater one of the two lateral dimensions, of approximately 85.6 mm and a width, as the smaller one of the two lateral dimensions, of approximately 54.0 mm, the width of the frame may be in the range of approximately 2 mm to 13.5 mm.

Consequently, by applying the concept of providing a frame for the card-type substrate respective desired characteristics of any such appropriate frame material may be taken advantage of while still providing sufficient area for implementing the electronic module and the antenna within the outline of frame. That is, upon selecting an appropriate geometric configuration of the frame in combination with providing a desired frame material the overall size of the inner area enclosed by the frame may appropriately be designed so as to accommodate the electronic module and the antenna having the required RF characteristics. For example, when maximizing the card internal area enclosed by the frame the dimensions of the antenna may be appropriately adapted, thereby providing sufficient area for an antenna design that results in sufficient RF performance of the antenna.

In a further illustrative embodiment the card-type information substrate includes an eddy current restriction component that is configured and arranged to restrict eddy currents in the frame. In this embodiment, the characteristics of many types of materials are taken into consideration with respect to their RF performance hampering behaviour. For example, certain materials of even low conductivity may exhibit a tendency for creating eddy currents when exposed to an electromagnetic field of a certain frequency range. For instance, many standardised payment cards may operate in a frequency range of approximately 11 to 20 MHz, which may result in respective eddy currents generated in the frame material, which in turn may negatively affect the radio frequency performance of the antenna.

In this respect it should be appreciated that the term eddy current is to be understood as having the meaning of including any physical mechanism resulting in losses of electromagnetic radiation emitted or received by the antenna due to the presence of the frame material. Consequently, by taking into consideration the possibility of the creation of eddy currents in the frame material the eddy current restriction component may appropriately be adapted so as to avoid or at least restrict the amount of dampening and thus the magnitude of eddy currents to an acceptable level.

In one illustrative embodiment at least a portion of the frame is formed of a conductive material. As already discussed in the introductory part of the description metal materials are frequently used in conventional payment cards so as to increase weight and enhance appearance of such cards. Consequently, by using a metal material or materials at least in one portion of the frame may therefore provide for the possibility of appropriately designing the weight and/or the outer appearance of the card-type substrate, wherein, however, any negative influence of the metal material(s) on the RF performance of the antenna may be taken into consideration by design and/or other mechanisms, such as the eddy current restriction components discussed above.

In a further illustrative embodiment the frame is formed of a non-conductive material, which, in one illustrative embodiment, may be provided in the form of ceramic. In this manner, the desired features of a frame in accordance with the present invention may be obtained, such as increasing weight and/or enhancing appearance of the card-type substrate, while substantially not negatively affecting the RF performance of the antenna. In one illustrative embodiment, the frame may be completely made of ceramic or any other appropriate non-conductive material without any intermediate conductive or metallic portions, thereby minimizing an influence on the RF performance of the antenna.

In a further illustrative embodiment the eddy current restriction component, discussed above, includes a slit that is formed in the frame. That is, in this illustrative embodiment the frame may be "interrupted" by a slit, but may otherwise completely enclose the substrate material of the card-type substrate. In this case, it has been recognized that even for conductive frame materials respective dampening mechanisms, i.e. eddy currents, may sufficiently be restricted so as to still provide for a required RF performance of the antenna. A width of the slit, i.e., the dimension of the slit along a circumferential direction of the frame, may be selected so as to obtain the required eddy current restricting functionality, while still achieving the desired optical and mechanical behaviour of the frame.

In a further illustrative embodiment the eddy current restriction component, as discussed above, includes a resistive portion that is connected to the frame and that has a lower specific conductivity compared to the conductivity of a base material of the frame. That is, the resistive portion may physically and/or electrically be connected to the frame so as to reduce the overall conductivity of the frame, which in turn may result in a reduction of any dampening mechanisms, i.e. eddy currents that may otherwise be generated in the frame in significant amounts during operation of the antenna.

In one illustrative embodiment, the resistive portion may include a slit in combination with a fill material that exhibits reduced conductivity. In this manner, the resistive portion is provided as portion physically connected to the frame and thus representing a part of the frame, while nevertheless reducing overall conductivity of the frame, even if the remaining portion of the frame may be formed of a metal or any other conductive material. In this manner, a substantially closed loop may be provided in the form of the frame based on any appropriate frame base material, while nevertheless the resistive portion(s) provide(s) for reduced losses upon operating the antenna. As already indicated, therefore the resistive portion(s) may represent a part of the frame, which in turn may thus be provided as a closed loop, thereby increasing overall mechanical robustness and also providing for superior outer appearance of the frame.

In other illustrative embodiments the frame is at least partially conductive and has a total conductivity that corresponds to a conductivity of 50 S/m (Siemens per meter) or less. As discussed above, using conductive materials as a base for the frame may be advantageous in some respects, for instance in terms of creating additional weight with a reduced amount of frame material and/or achieving a desired appearance of the frame by using certain alloys, and the like providing specific optical effects, while nevertheless the overall conductivity may be controlled to the above-specified value range in order to maintain the loss mechanisms at a low level so as to still achieve the required RF performance of the antenna. For example, the frame may be made of a base material having a conductivity of 50 S/m or less without requiring any other materials of reduced conductivity, thereby achieving consistent material characteristics along the entire circumferential extension of the frame, while still ensuring appropriate RF performance of the antenna.

In still other illustrative embodiments the frame is, in total, conductive and includes at least one portion of reduced conductivity so as to obtain the desired total conductivity as specified above. In this manner, a high degree of flexibility is provided in establishing a desired total conductivity while on the other hand enabling the usage of a number of conductive materials i.e. of materials of increased conductivity, while adjustment of the total conductivity may still be reliably insured by providing the at least one portion of reduced conductivity.

In one illustrative embodiment the at least one portion of reduced conductivity includes a region of reduced material thickness. In this manner, a desired total conductivity may readily be adjusted for many types of conductive materials, while a consistent optical appearance may be maintained at least at one surface of the frame.

In illustrative embodiments the antenna is a planar antenna formed of metal traces, which are formed on a carrier material. In this manner, established manufacturing techniques may be applied so as to obtain a desired type of overall antenna configuration for a planar architecture. For example, techniques for selectively depositing material, non-selective deposition techniques in combination with lithography processes and etch techniques, and the like may be used, thereby enabling the generation of even highly complex antenna geometries on the basis of cost-efficient manufacturing techniques that insure minimal process variations and, thus, result in reproducible RF behaviour.

In still other illustrative embodiments the antenna is formed of a wire that is embedded in a carrier material. Consequently, any such "wire embedded" configurations for an antenna may also efficiently be implemented into the card-type information substrate, since the RF behaviour may be adjusted on the basis of techniques as discussed above by adapting frame configuration to the specific antenna design.

In further illustrative embodiments the operative coupling between the electronic module and the antenna is established by a direct electrical, i.e. a wired, connection between the antenna and the electronic module. That is, in these embodiments a wired connection is established between the electronic module and the antenna, thereby contributing to reduced overall losses of the entire system composed of the electronic module and the antenna provided within the outline of the frame. Consequently, electronic modules without having incorporated therein a module internal coupling antenna may be used, which may per se provide for superior overall RF performance of a module-antenna system established for wireless information exchange with an external reader device.

In still other illustrative embodiments the operative coupling between the electronic module and the antenna is established by inductive coupling between the antenna and the electronic module. In this manner, well-established electronic modules having incorporated therein the coil for inductive coupling may be used, while the required RF performance of the antenna for communicating with an external reader device may still be achieved based on the techniques as discussed above, even though the antenna is provided within the outline of the frame.

In further illustrative embodiments of the present invention the card-type information substrate has two opposing long sides, wherein the antenna is arranged symmetrically with respect to the two opposing long sides. Thus, by a corresponding design, in which symmetry with respect to the long sides of the card is taken into consideration, generally the influence of the frame on the antenna may be reduced, even if the antenna contains conductive materials, such as metals. In this respect, the symmetry of the antenna with respect to the long sides of the substrate is to be understood as referring to a configuration, in which the distances of the respective antenna long sides to the respective adjacent long sides of the substrate are equal. That is, the antenna is centered with respect along the width dimension of the substrate.

In one illustrative embodiment, a distance of the antenna from the two opposing long sides is at least 6 mm. It has been recognized by the inventors that when applying standard dimensions in the lateral and thickness dimensions for the card-type information substrate, as are typically used for payment cards and the like, a distance of at least 6 mm may result in a significant improvement of the RF performance of the antenna. Consequently, by appropriately adapting the dimensions of the frame, as already discussed above, the available area of the card that is enclosed by the frame may be adjusted such that for a given lateral size of the antenna the distance as specified above may be obtained.

In illustrative embodiments disclosed herein the card-type information substrate is a payment card having standard dimensions. That is, in these illustrative embodiments the frame may advantageously be implemented in a standard payment card, while still ensuring efficient wireless information exchange capability with an external reader device, for instance by complying with established RF standards for wireless communication in the field of payment cards.

It should be appreciated, however, that the principles disclosed herein may also be used in combination with other card-type substrates with differing dimensions when the implementation of any such differing lateral dimensions and/or thickness dimensions may become necessary in certain applications.

The above-referenced technical object is also solved by a method of forming a card-type information substrate. The substrate comprises a frame, an antenna for wireless communication and an electronic module that is operatively connected to the antenna. The method includes determining at least one metric that represents a desired radio frequency performance of the antenna. Moreover, the method includes selecting a total conductivity of the frame and/or a position of the antenna within an outline of the frame and/or performance of the electronic module on the basis of the at least one metric so as to achieve the desired radio frequency performance.

In this aspect of the present invention the presence of the frame in the card-Information substrate may be estimated by determining the metric representing the radio frequency performance of the antenna. That is, the influence of the frame on the radio performance may be assessed on the basis of at least one metric or parameter value that specifies radio frequency performance in the presence of the frame. Based on the required radio frequency performance appropriate measures may be taken so as to tune the actual radio frequency performance of the antenna. To this end, the effect of one or more features, such as the total conductivity of the frame, the tendency of creating eddy currents in the frame, the design of the antenna and the position thereof within the outline of the frame, the RF performance of the electronic module and/or any combinations of these features may be evaluated so as to establish appropriate design and configuration concepts for implementing respective features into the frame and/or the antenna and/or the electronic module so as to approximate the metric determined in advance. A corresponding evaluation of the various measures or features for establishing a required RF performance of the antenna in the presence of the frame may include experiments and/or simulation calculations, which may result in respective parameter values or ranges, which allow approximation to the desired metric within a desired tolerance range.

For example, for conductive materials and for given dimensions of the frame under consideration a respective metric in the form of a maximum allowable total conductivity may be established on the basis of experiments and/or calculations in order to quantify the influence of the design and overall conductivity of the frame on the RF performance of the antenna. Similarly, the overall design and/or the lateral size and/or the lateral distance of the antenna from the frame may be quantified on the basis of appropriate parameters or parameter ranges in order to provide numerical values for estimating the influence on the overall RF performance of the antenna. Likewise, the RF characteristics of the electronic module itself and the type of coupling the electronic module to the antenna, i.e. direct coupling or inductive coupling, may also be evaluated on the basis of experiments and/or simulations in order to obtain the respective numerical parameter values or value ranges.

Consequently, upon having determined the desired or required RF performance of the card-type information substrate based on a basic card configuration including a frame and an antenna positioned within the outline of the frame, the respective effects of the individual factors and characteristics affecting the overall RF performance may be taken into consideration by referring to the established parameter values of value ranges. Also, respective mutual correlations of the various parameters may be determined in advance in order to evaluate the combined effect on the RF behaviour and to provide for superior flexibility in designing a respective card-type information substrate.

For example, if a certain minimum width and a certain material composition for the frame are set in advance as desired design criteria, respective RF related parameters previously determined may be referred to, which in combination with parameters representing the frame width and material composition of the frame may allow the estimation of the RF behaviour and therefore result in the desired RF performance without the need of extensive prototyping. In this manner, having established representative parameters for a number of influences on the RF performance, desired design criteria may be set in advance that have to be met, while the remaining parameters may provide for sufficient flexibility an appropriately adapting other design aspects in order to arrive at the desired RF performance. For instance, if weight and/or external appearance criteria may be set in advance, then other aspects may be selected in accordance with the pre-established parameter values, such as overall conductivity of the metal frame possibly in combination with overall RF performance of the electronic module, possibly in combination with design, configuration and position of the antenna in order to achieve the required RF performance.

In illustrative embodiments, any such parameter matching process may be implemented in a computer device on the basis of an appropriately designed instruction set, wherein respective parameters representing RF relevant features of the card-type information substrate may be stored in a respective database that may be accessed by the respective program instructions. Generally, the respective database may continuously be updated on the basis of experiments, simulations and data obtained from actual cards operated under real life conditions. In this manner the overall process of developing and producing frame-based card-type substrates may be "automated" to a certain degree, thereby increasing reproducibility and thus yield of the manufacturing process.

BRIEF DESCRIPTION OF THE DRAWINGS

Further illustrative embodiments and other aspects of the present invention will be described in more detail in the following specification, while also referring to the accompanying drawings, in which FIG. 1A schematically illustrates a top view of a card-type information substrate according to an illustrative embodiment;

FIG. 1B schematically illustrates a cross-sectional view of the card-type information substrate of FIG. 1A according to one illustrative embodiment;

FIGS. 2A and 2B schematically illustrate top views of configurations with different placement of an antenna with respect to a frame of a card-type information substrate according to illustrative embodiments;

FIG. 2C schematically illustrates a table of parameters or metrics representing the RF performance of the configurations of FIGS. 2A and 2B, respectively;

FIGS. 3A to 3D schematically illustrate top views of card-type information substrates with a frame including an eddy current restricting component according to illustrative embodiments;

FIG. 3E illustrates a table correlating respective RF metrics to the configurations of FIG. 3A two 3D, respectively, according to illustrative embodiments;

BEST MODE(S) FOR CARRYING OUT THE INVENTION

Figures 4A, 4B:
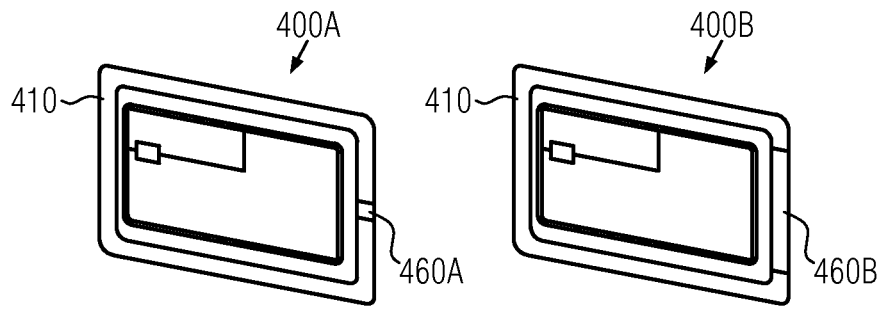
FIGS. 4A and 4B schematically illustrate top views of card-type information substrates with at least one eddy current restricting component having a varying configuration according to illustrative embodiments.

With reference to the accompanying drawings further illustrative embodiments of the present invention will now be described in more detail.

FIG. 1A schematically illustrates a top view of a card-type information substrate 100, wherein a card-type substrate is to be understood as a substrate, the lateral dimensions of which are a significantly greater than its dimension in a thickness direction. It should be appreciated that lateral dimensions in FIG. 1A correspond to dimensions within the drawing plane of FIG. 1A, while a thickness direction is a direction perpendicular to the drawing plane of FIG. 1A. For example, the lateral dimensions of the card-type substrate 100 may be several centimetres, while a dimension in the thickness direction may be several millimetres or significantly less, such as several hundred micrometers. In illustrative embodiments, the card-type substrate 100 represents a card used for payment or other transactions, for which dimensions in the lateral directions and in the thickness direction is are set by respective standards, established for many types of payment cards, credit cards, and the like.

The card-type substrate 100 includes a substrate material 140, which may typically comprise any type of appropriate plastic, such as polymer materials of various types, such as polycarbonate, PVC materials, and the like. It should be appreciated that the substrate material 140 may typically be provided in the form of several functional layers that are laminated so as to achieve the various requirements for the substrate 100. At least partially embedded in the substrate material 140 there is provided an electronic module 120, which may have implemented therein any required functionality so as to store information, respond to externally supplied signals, and the like. Any such electronic modules are well known in the art and may efficiently be used in combination with the present invention.

Moreover, the card-type substrate 100 includes a frame 110 that is physically connected to the substrate material 140 and/or may be embedded therein, depending on the overall configuration. Basically, the frame 110 imparts additional weight to the card-type substrate 100, as previously discussed, thereby contributing to superior handling of the substrate 100. Furthermore, the frame 110 may contribute to superior outer appearance of the substrate 100, for instance by generating specific optical effects, such as metallic reflection, and the like. As also previously discussed, the frame 110 has a width 110W, which may represent a dimension in a direction that is perpendicular to a circumferential direction of the frame 110. The width 110W, which in some embodiments may vary along the circumferential extension of the frame 110, is selected so as to expose a significant inner area of the card-type substrate 100, thereby enabling the placement of the electronic module 120 and an antenna 130, which is designed so as to enable wireless communication with an external reader device (not shown). To this end, the width 110W is selected to be 3% or less of a selected total lateral dimension of the card-type substrate 100 and up to 25%, such as 15%, or 10% of the smaller one of the lateral dimensions of the substrate 100. For example, in FIG. 1A the card-type substrate 100 has a rectangular configuration in the top view of FIG. 1A with two long sides 110L and two short sides 110S,. In this case, the width 110W may be within the range as specified above with the short sides 110S acting as a reference. In some illustrative embodiments the width 110W may vary along the perimeter of the substrate 100. For example, within the above-referenced limits, the width of the frame 110 along the long sides 110L may differ from the width of the frame 100 along the short sides 110S. Also, any other configuration with varying widths of the frame 110 may be realized. For example, the frame 110 may have along a certain portion or along its entire circumferential extension a repetitive or non-repetitive pattern of segments of differing width dimensions, such as an alternating sequence of segments having alternatingly an increased and reduced width, and the like. In this manner, a certain interdigitated configuration with respect to the substrate material 140 may be obtained on the inner perimeter and/or the outer perimeter of the frame 100, thereby increasing mechanical robustness of the connection between the frame 110 and the substrate material 140 and/or contributing to higher flexibility in designing the visual effects of the substrate 100.

Moreover, in the embodiment as shown in FIG. 1A the frame 110 may represent a closed loop and may thus completely enclose the inner area of the card-type substrate 100, while in other cases, as will be discussed later on, the frame 110 may be interrupted at least at one position so as to form an interruption or slit that disconnects the frame 110 along its circumferential extension.

The antenna 130 that is formed within the outline of frame 110, i.e., in the inner area of the card-type substrate 100, is configured to be operatively coupled to the electronic module 120 so as to allow wireless communication of the electronic module 120 with the external reader device.

In some illustrative embodiments, the antenna 130 is provided in the form of a planar antenna formed by conductive traces that are formed on an appropriate carrier material. In other cases, a discrete wire material may be used, wherein respective portions of the wire may be embedded in a carrier material, which may represent a separate carrier material or may represent at least a layer of the substrate material 140.

It should be appreciated, however, that the antenna 130 may be provided in any appropriate form on the basis of any appropriate materials, as long as the design, configuration and placement of the antenna 130 are appropriate for providing the desired RF performance.

FIG. 1B schematically illustrates a cross-sectional view of the card-type substrate 100 of FIG. 1A according to illustrative embodiments. As shown, the card-type substrate 100 includes the frame 110 having the width 110W in accordance with configuration, i.e., design and weight criteria, as specified above. Furthermore, a thickness 110T of the frame 110 may be selected in accordance with overall design requirements so as to obtain the desired characteristics of the frame 110. For example, the thickness 110T may substantially correspond to a total thickness of the card-type substrate 100, thereby allowing, for a given width 110W, implementation of a maximum amount of material, which may be advantageous in obtaining additional weight for the card-type substrate 100 and also for providing for superior mechanical robustness with respect to an impact that laterally acts on the card-type substrate 100. It should be appreciated that in some illustrative embodiments, at least in some portions the thickness 110T of the frame 110 may vary, for instance by providing at least one portion of reduced thickness, as indicated by a portion 110R, thereby locally adapting the characteristics of the frame 110. For example, when providing the frame 110 on the basis of a material having a certain base conductivity, reducing the thickness of one or more portions may result in a reduced overall conductivity of the frame 110.

As already discussed above, using a conductive material as base material for the frame 110 may result in a negative influence on the RF performance of the antenna 130 and therefore, in some illustrative embodiments, specific conductive materials having a specified low conductivity, such as approximately 50 S/m (Siemens per meter), may be used, possibly in combination with other measures, such as an eddy current restricting component, so as to adjust the overall conductivity of the frame 110. Using a base material of reduced conductivity may thus allow providing the frame 110 as a closed loop, while nevertheless maintaining loss mechanisms, such as eddy currents, at an acceptable level, as discussed above.

Moreover, the card-type substrate 100 includes the electronic module 120 that is embedded in the substrate material 140. In some embodiments (not shown) the module 120 may include contact elements designed and positioned so as to allow direct contact with respective complementary contact elements of an external reader device. In this case, the card-type substrate 100 may communicate with the external reader device on the basis of direct contact and on the basis of wireless communication.

Furthermore, as illustrated, the antenna 130 may be provided in the form of conductive traces 130A and 130B, for instance implemented in the form of copper traces that are formed on an appropriate carrier material 131. As discussed above, the specific configuration of the antenna 130 is not restricted, as long as the respective configuration and design are compatible with the overall configuration of the card-type substrate 100 so as to enable the required RF performance.

Furthermore, in some embodiments the electronic module 120 may directly be connected to the antenna 130 (not shown), while in other cases, as for instance shown in FIGS. 1A and 1B, the electronic module 120 may be inductively coupled to the antenna 130. As will be discussed later on in more detail, the respective coupling of the electronic module 120 to the antenna 130 may have to be taken into consideration when selecting specific components or measures for adjusting the final RF performance of the card-type substrate 100.

FIGS. 2A and 2B schematically illustrate top views of card-type substrates 200A and 200B, respectively. In FIG. 2A the card-type substrate 200A the configuration of an electronic module 220 may substantially be identical to the corresponding configuration in the card-type substrate 200B of FIG. 2B. However, in FIG. 2A the lateral position of the configuration of the components 220, 230 with respect to a frame 210 may be different from the respective configuration as shown in FIG. 2B. As illustrated, distances 210F, 210E of the antenna 230 from respective long sides 210L of the frame 210 may be approximately 2.6? millimetres and 9.9 millimetres, respectively, thereby providing an asymmetric geometry with respect to the long sides 210L. It should be appreciated that in other embodiments the distances 210F, 210E may be selected differently in order to meet specific design criteria. Moreover, as also discussed above in the context of the frame 100 of FIG. 1A the frame 210 may have a varying width. In this case the distances 210F, 210E may represent a shortest distance between the respective segment of the frame 210 and the antenna 230.

On the other hand, the configuration in FIG. 2B provides for a substantially symmetric configuration of the antenna 230 with respect to the long sides of the frame 210, thereby obtaining a distance 210D of approximately 6.2 millimetres, wherein it should be appreciated that the overall lateral dimensions of the card-type substrates 200A, 200B may comply with standards for typical payment cards. It should be appreciated that generally increasing the distance 210D is advantageous in terms of RF performance so that a symmetric design with the distance 210D of 6 mm and greater is used in some illustrative embodiments.

FIG. 2C illustrates a table that correlates RF performance related metrics with the geometric configurations as shown in FIGS. 2A and 2B. That is, as illustrated, three RF related metrics or parameters are provided, such as resonance frequency of the antenna 230, intensity decrease due to coupling to a standardised coupling coil (not shown) in accordance with standardised procedures for evaluating RF performance, also referred to and known as S11 value, and a respective pass rate in a standardised EMVCo test. Basically, the pass rate value indicates RF intensity at a plurality of specified positions across the antenna. As is evident from FIG. 2C, the card-type substrate 200A has a resonance frequency of 14.5 MHz, while the S11 value is minus 1.3 and the pass rate is 63/91.

On the other hand, the card-type substrate 200B has a resonance frequency of 14.3 MHz while the S11 value is minus 1.8 and the pass rate is 77/91. Consequently, for basically the same design and relative placement of electronic module 220 with respect to antenna 230 a significant improvement of the RF performance may be obtained for the substrate 200B, as indicated by the S11 value, wherein a higher negative value indicates superior RF performance.

Also, the pass rate, here a higher value indicates better RF performance, is significantly increased compared to card-type substrate 200A. Consequently, a symmetric configuration of the antenna 230 with respect to the frame, at least in view of the long sides 210L results in superior overall RF performance. This concept increasing the distance 210D in a symmetric manner may efficiently be combined with any further measures for enhancing overall RF performance. It should be appreciated that respective metrics of FIG. 2C may reflect the results for a closed loop frame 210 formed of a conductive material, such as stainless steel, or any other metal or metal alloy may be considered appropriate for increasing weight and/or enhancing appearance of the card-type substrates 200A, 200B.

It should be appreciated that in other respects the card-type substrates 200A, 200B may have substantially the same configuration as discussed above with reference to the card-type substrate 100. Hence, the description of any such other aspects of a card-type substrate will be omitted.

FIGS. 3A to 3D schematically illustrate top views of respective card-type substrates 300A to 300D, wherein the card-type substrate 300A is provided without frame, while the card-type substrates 300B to 300D are formed on the basis of a conductive frame. Furthermore, the card-type substrates 300C and 300D may additionally be provided with an eddy current restricting component, which may significantly improve overall RF performance in the context of a frame that has a tendency of generating eddy currents upon being exposed to an electromagnetic field.

FIG. 3A schematically illustrates the card-type substrate 300A, which may be considered as a conventional card including an electronic module 320, an antenna 330 and any other components, which, for convenience, are not specifically described in this context, however, without a frame.

On the other hand, the card-type substrate 300B represents one illustrative embodiment, in which a frame 310 in combination with the module 320 and the antenna 330 is provided. In one illustrative embodiment, the frame 310 may be formed of a non-conductive material, such as a ceramic material, thereby substantially avoiding the generation of any eddy currents, so that basically a similar RF performance may be obtained as is obtained by the card-type substrate 300A. In the embodiment shown in FIG. 3B, however, the frame 310 may be provided in the form of a conductive material, such as stainless steel, any other metal or metal alloy so as to comply with design requirements for a specific application.

FIG. 3C schematically illustrates the card-type substrate 300C including the frame 310 formed of a conductive material and additionally including an eddy current restricting component 360, which may be implemented in the form of a slit 360C, which, thus, interrupts the closed loop design of the frame 310.

FIG. 3D schematically illustrates the card-type substrate 300D with the frame 310 made of a conductive material, as discussed above, wherein the eddy current restricting component 360 may be provided in the form of a resistive portion 360D, as is illustrated in a symbolic form by a cut out or slit of the frame 310 and resistor electrically bridging the slit or cut out. It should be appreciated, however, that in some illustrative embodiments the resistive portion 360D represents a slit in combination with an appropriate fill material so as to provide a mechanically stable closed loop frame, while in other cases, the base material of the frame 310 may include one or more portions of reduced thickness. For instance, as discussed in the context of FIG. 1B when referring to the portion of reduced thickness 110R, the overall conductivity of the frame 310 is reduced, even if the conductivity of the base material of the frame 310 is moderately high.

In still other illustrative embodiments, the resistive portion 360D may represent any portion, in which material characteristics of a base material may have been appropriately modified, for instance by incorporating, for instance by ion implantation, and the like, additional substances to the structure of the base material, by causing significant damage in the basic crystalline structure of the base material, and the like. Providing one or more resistive portions of the frame 310 by modifying the characteristics of the base material may advantageously preserve a certain mechanical stability, while still yielding a significant modification of the electrical behaviour. In this case, the processing of the frame 310 upon connecting the frame 310 to substrate material of the card-type substrate may still be based on handling a single frame component while nevertheless providing electrically very different portions of the frame 310.

With respect to any other components of the respective card-type substrates it may also be referred to the description in the context of FIGS. 1A to 2C above.

FIG. 3E schematically illustrates a table that correlates respective parameters or metrics that represent the RF performance of the respective antennas 330 with the various configurations.

As is evident, the substrate 300A in FIG. 3A, i.e., the card without any frame, and in particular without any conductive frame, has a resonance frequency of 13.3 MHz, while the S11 value is minus 7.3 and the pass rate is 89/91, thereby indicating good RF performance. As discussed above, when in some embodiments the frame 310 is provided on the basis of a non-conductive material, such as a ceramic material, substantially identical values for the RF related metrics are obtained. That is, for a configuration as shown in FIG. 3B, in which the frame 310 is formed of a non-conductive material basically the values of the first line of the table in FIG. 3B are obtained.

On the other hand, when providing the frame 310 as a metal frame of moderately high conductivity, such as stainless steel in order to address respective design criteria, a resonance frequency of 14.2 MHz, an S11 value of minus 1.9 and a pass rate of 77/91 may be obtained. In many cases, these metrics may be considered as not being appropriate in representing the desired RF performance of the antenna 330. Therefore, in some illustrative embodiments, a conductive material with a conductivity of less than 50 S/m may be used so as to arrive at an acceptable RF performance. In one illustrative embodiment, the conductivity of the base material of the frame 310 provided in the form of a closed loop and having a configuration as for instance discussed above in the context of FIGS. 1A and 1B, the conductivity of the conductive material may be selected to be less than 50 S/m, such as 10 S/m, in some embodiments.

The configuration of FIG. 3C including the eddy current restricting component 360 in the form of the slit 360C for a frame 310 base material having a moderately high conductivity as typically associated with metal materials selected in view of certain design criteria, may result in a resonance frequency of 13.3 MHz, an S11 value of minus 6.9 and a pass rate of 89/91, which is comparable to the configuration without a conductive frame as described and shown in the context of FIG. 3A.

Similarly, the configuration of FIG. 3D including the resistive portion 360 as the eddy current restricting component 360 results in the same resonance frequency with an S11 value of minus 4.6 and a pass rate of 90/91, thereby obtaining a desired RF performance. As discussed above, in some illustrative embodiments, when providing the eddy current restricting component 360 in the form of a slit, this slit may also be filled with any appropriate fill material with reduced conductivity, for example, a conductivity of less than 0.5 S/m, and/or the gap size of the slit 360B may be varied so as to obtain the desired metrics for the RF performance.

It should be appreciated that the embodiments shown in FIGS. 3A to 3D refer to an antenna, such as the antenna 330, that is formed of metal traces, such as copper traces, formed on a carrier material, for example, by an etch process. Substantially the same criteria and results also apply to an antenna that is formed by an embedded wire. Thus, irrespective of the technique used for forming the antenna, the frame 310 may be provided so as to achieve the required RF performance.

FIGS. 4A and 4B schematically illustrate top views of card-type substrates 400A, 400B, respectively, in which an eddy current restricting component is implemented in the form of a slit in combination with an appropriate fill material of insulating character or reduced conductivity. As shown, the card-type substrates 400A, 400B include respective frames 410 with respective eddy current restricting components 460A, 460B, respectively. In this case, these components 460A, 460B are represented by gaps of different size having incorporated therein a fill material of reduced conductivity, for example of 0.5 S/m or less, such as 0.2 S/m and less. Providing the slits with different gap sizes and filling the slits with appropriate fill materials results in superior mechanical stability of the entire frame, as discussed above, in particular when processing of the frames 410 as single components during manufacturing the card-type substrates 400A, 400B. That is, when mechanically fixing the frame to the substrate material the entire frame may be handled in the form of a single component. Furthermore, by allowing the usage of a fill material with a specified conductivity, that is, not requiring an insulating material, superior flexibility in designing the overall configuration of the frames 410 may be achieved. For example, the fill material may be selected with respect to optical appearance, mechanical robustness, connection behaviour with respect to the frame-based material, and the like, wherein not necessarily an insulating material may have to be used, when such an insulating material would not meet one or more of the desired criteria, such as optical appearance, and the like.

Figure 4C:
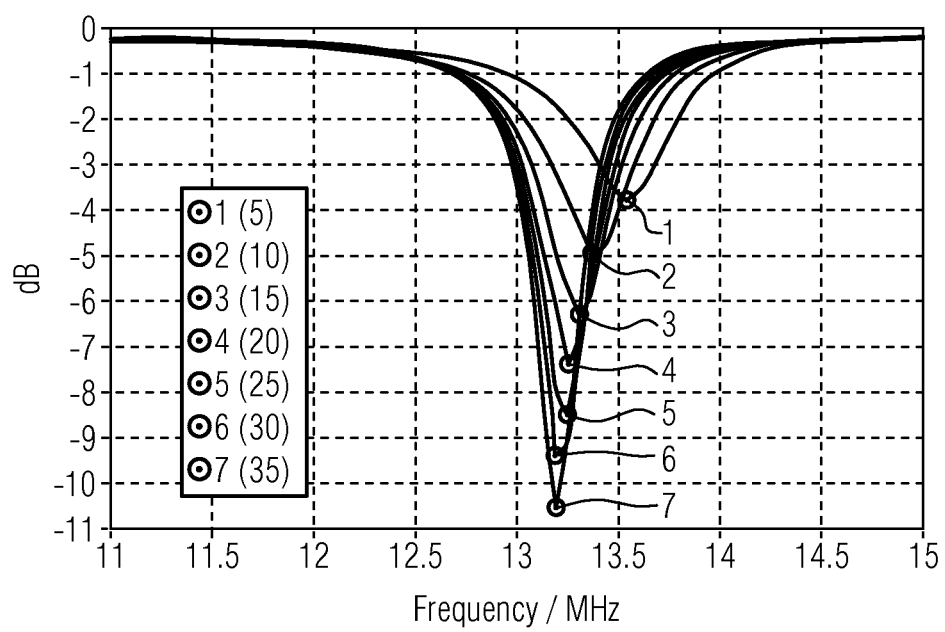
FIG. 4C schematically illustrates a representation of parameters or metrics for representing or evaluating the RF performance of the card-type substrate upon varying at least one feature, such as a gap size of a slit formed in the frame according to illustrative embodiments.

FIG. 4C schematically illustrates RF related metrics or parameters in relation to different gap sizes of the slits 460A, 460B. For example, curves 1 to 7 represent the respective RF metrics of the substrates 400A, 400B for varying gap sizes for otherwise identical parameters. That is, the gap sizes vary from 5 mm, represented by curve 1, to 35 mm, represented by curve 7. Consequently, in this case, a plurality of parameters and value ranges may be established that correspond to and quantify the respective RF performance of card-type substrates. In this manner, a collection of parameter values may be obtained, which may efficiently be used in designing the respective card-type information substrates that comply with one or more RF related metrics, which may be determined in advance so as to meet specific performance requirements.

Figure 5A:
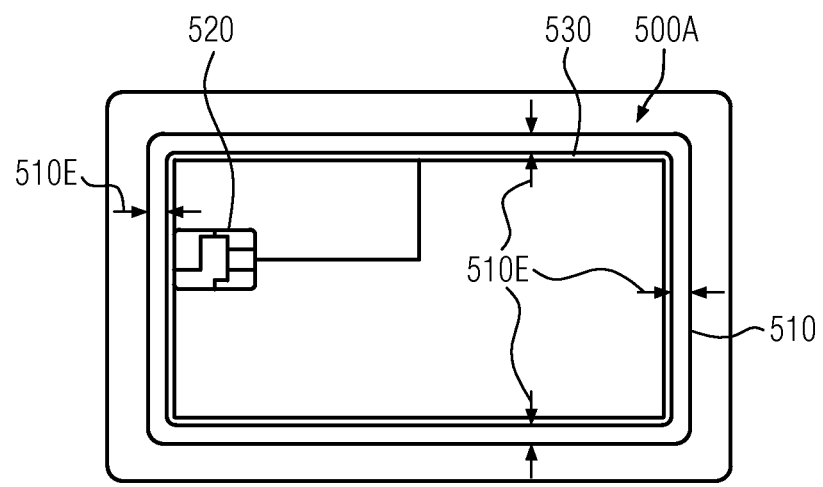
FIGS. 5A and 5B schematically illustrate top views of a design of card-type substrates with a direct electrical connection of an electronic module to an antenna according to still further illustrative embodiments.
Figure 5B:
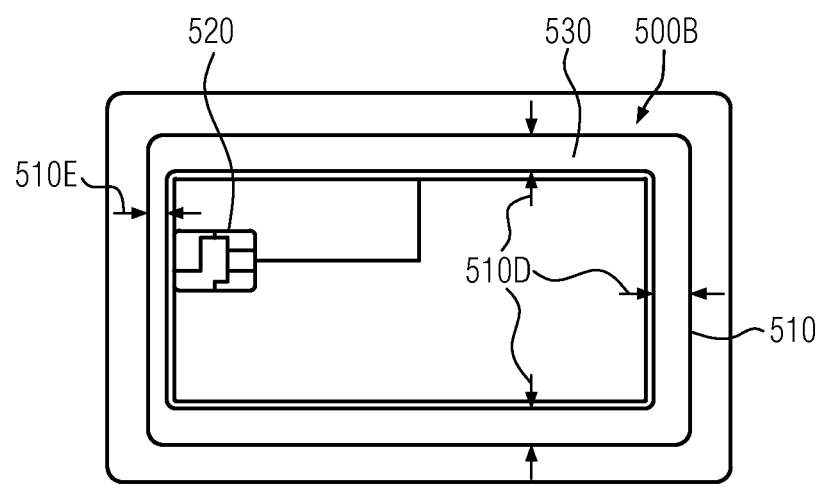

FIGS. 5A and 5B schematically illustrate top views of card-type substrates 500A, 500B, respectively, in which respective electronic modules 520 may be directly connected, i.e., connected by wire, to a respective antenna 530, thereby taking advantage of the fact that a direct connection between electronic module and antenna may result in superior RF performance compared to an inductive coupling of electronic module and the corresponding antenna. Consequently, by designing a frame 510 so as to impart increased weight and/or enhanced appearance to the respective substrates, the direct coupling may result in increased design flexibility, since respective measures for taking into consideration the influence of the frame 510, in particular, when comprising conductive material, may be increased, due to per se enhanced RF performance of the directly coupled electronic modules 520.

In FIG. 5A the distances 510E are selected to approximately 3 mm, whereas in FIG. 5B the distance 510E is approximately 3 mm and the distances 510D are approximately 5.5 mm. It should be appreciated that these values are merely design examples so as to demonstrate configuration with a wired connection between the module 520 and the antenna 530. In other cases the distances 510D, 510D may be selected differently in order to meet the design and RF requirements of a specific use case.

It is to be noted that any of the concepts for reducing the effect of dampening mechanisms, such as eddy currents, described above may appropriately be combined so as to achieve a desired RF performance in combination with specific design goals in terms of card weight and/or appearance and/or mechanical robustness of a card-type information substrate. That is, when, for instance, setting certain design aspects in advance with respect to providing a frame for a card-type substrate and by appropriately taking into consideration the characteristics of one or more of the materials to be used in forming the frame, one or more RF related metrics may be determined that have to be met. Based on these one or more RF related metrics appropriate measures may then be taken as to adjust the RF behaviour finally to be achieved. For example, if it is determined in advance that specific requirements of a card-type substrate may be met on the basis of a non-conductive frame material, such as a ceramic material, the respective design of the antenna may be accomplished on the basis of lateral dimensions of the frame, while any influence of loss mechanisms, such as eddy currents, may substantially be neglected. If in other cases specific design criteria call for usage of a conductive material in the frame, and if specific dimensions of the frame may be preset in order to address specific requirements, then the respective parameter values obtained, as described above, may be consulted in providing an appropriate overall design that leads the predetermined one or more metrics with respect to RF behaviour.

For example, the implementation of a slit and/or providing appropriate fill material for the slit, and/or adjusting and/or selecting the basic conductivity of the frame base material and/or selecting the type of operative coupling between electronic module and the antenna and/or selecting a specific electronic module having a specified RF behaviour may be applied as design techniques, for instance based on respective parameter value ranges established in advance, so as to obtain a desired configuration that meets the necessary RF performance. In some illustrative embodiments the design of the card-type substrate may be performed in a highly automated manner by maintaining a database that stores respective RF related metrics in correlation with the their physical implementations in the card, so that for instance upon entering one or more design goals into a corresponding system one or more alternative designs may be output based on the data and correlations stored in the database.

In illustrative embodiments (not shown) one or more additional "heavy" components, such as a metal slug, may be incorporated in a central portion of the substrate, thereby further increasing the weight of the substrate, while maintaining superior RF performance. That is, the principles disclosed herein provide for the possibility of adapting the overall RF behaviour of a card-type information substrate, even if in addition to a heavy frame, for example, a metal containing frame, any further heavy components may be implemented. In particular, when a conductive material for the one or more additional heavy components, such as a metal slug, is used, the RF performance is still adjustable so as to meet the RF requirements for the specific use case.

The invention claimed is:

1. A card-type information substrate, comprising
a substrate material made of plastic;
an electronic module embedded in said substrate material; and
an antenna operatively coupled to said electronic module to perform wireless communication; characterized in that
a frame is formed around the perimeter of said substrate material and said antenna is positioned within an outline of said frame,
wherein a thickness of said frame corresponds to a combined thickness of said substrate material and said antenna, and to a total thickness of said card-type information substrate and the material of said frame has a higher specific weight compared to the substrate material, so that the frame imparts weight and/or optical appearance to said card-type information substrate, wherein the frame is configured to reduce effect on the resonance frequency of the antenna.

2. The card-type information substrate of claim 1, further comprising an eddy current restriction component configured and arranged so as to restrict eddy currents in said frame.

3. The card-type information substrate of claim 2, wherein said eddy current restriction component comprises a slit, formed in said frame.

4. The card-type information substrate of claim 2, wherein said eddy current restriction component comprises a resistive portion connected to said frame and having a lower specific conductivity compared to a conductivity of a base material of said frame.

5. The card-type information substrate of claim 4, wherein said resistive portion comprises a slit and a fill material of reduced conductivity.

6. The card-type information substrate of claim 5, wherein said frame in combination with said slit and said fill material forms a closed loop.

7. The card-type information substrate of claim 4, wherein said resistive portion is provided as part of said frame.

8. The card-type information substrate of claim 1, wherein at least a portion of said frame is formed of a conductive material.

9. The card-type information substrate of claim 1, wherein said frame is formed of a non-conductive material.

10. The card-type information substrate of claim 1, wherein said frame is at least partially conductive and has a total conductivity that corresponds to a conductivity of 50 S/m or less.

11. The card-type information substrate of claim 10, wherein said frame is made of a base material having a conductivity of 50 S/m or less.

12. The card-type information substrate of claim 10, wherein said frame is conductive and includes at least one portion of reduced conductivity so as to obtain said total conductivity.

13. The card-type information substrate of claim 12, wherein said at least one portion of reduced conductivity includes a region of reduced material thickness.

14. The card-type information substrate of claim 1, wherein said antenna is a planar antenna formed of metal traces formed on a carrier material.

15. The card-type information substrate of claim 1, wherein said antenna is formed of a wire embedded in a carrier material.

16. The card-type information substrate of claim 1, wherein said operative coupling between said electronic module and said antenna is established by a direct electrical connection between said antenna and said electronic module.

17. The card-type information substrate of claim 1, wherein said operative coupling between said electronic module and said antenna is established by inductive coupling between said antenna and said electronic module.

18. The card-type information substrate of claim 1, wherein said card-type information substrate has two opposing long sides and wherein said antenna is arranged symmetrically with respect to said two opposing long sides.

19. The card-type information substrate of claim 18, wherein a distance of said antenna from said two opposing long sides is at least 6 mm.

20. The card-type information substrate of claim 1, wherein said card-type information substrate is a payment card having standard dimensions.

21. A method of forming a card-type information substrate comprising:
   selecting a substrate material;
   providing said substrate material with an electronic module; and
   providing said substrate material with an antenna operatively coupled to said electronic module to perform wireless communication;
   the method being characterized in that
   said substrate material is provided with a frame which is combined with said substrate material, wherein a thickness of said frame corresponds to a combined thickness of said substrate material and said antenna, and to a total thickness of said card-type information substrate and the material of said frame has a higher specific weight compared to said substrate material, so that said frame imparts additional weight and/or superior optical appearance to said card-type information substrate, wherein the frame is configured to reduce effect on the resonance frequency of the antenna.

22. The method of claim 21 wherein the method further comprises:
   determining at least one metric that represents a desired radio frequency performance of said antenna; and
   selecting at least one of a total conductivity of said frame, a position of said antenna within an outline of said frame and a performance of said electronic module on the basis of said at least one metric so as to achieve said desired radio frequency performance.

23. The method of claim 22, wherein selecting at least one of a total conductivity of said conductive frame, a position of said antenna within an outline of said frame and a performance of said electronic module comprises: forming at least one slit in said frame.

24. The method of claim 22, further comprising selecting, on the basis of said at least one metric, at least one of a conductivity of a base material of said frame and a conductivity of a fill material to be formed within a slit that is formed in said frame.

* * * * *